(12) United States Patent
Kim

(10) Patent No.: US 11,933,011 B2
(45) Date of Patent: Mar. 19, 2024

(54) CONSTRUCTION METHOD FOR UNDERWATER CONCRETE BLOCK STRUCTURE

(71) Applicant: YUJOO CO., LTD., Busan (KR)

(72) Inventor: Sang Gi Kim, Busan (KR)

(73) Assignee: YUJOO CO., LTD., Busan (KR)

( * ) Notice: Subject to any disclaimer, the term of this patent is extended or adjusted under 35 U.S.C. 154(b) by 98 days.

(21) Appl. No.: 17/893,871

(22) Filed: Aug. 23, 2022

(65) Prior Publication Data

US 2022/0412030 A1     Dec. 29, 2022

Related U.S. Application Data

(63) Continuation of application No. PCT/KR2021/002662, filed on Mar. 4, 2021.

(30) Foreign Application Priority Data

Mar. 10, 2020 (KR) .......................... 10-2020-0029331

(51) Int. Cl.
| | |
|---|---|
| *E02B 3/06* | (2006.01) |
| *E02D 13/04* | (2006.01) |
| *E02D 25/00* | (2006.01) |
| *E02D 27/52* | (2006.01) |
| *E02D 29/02* | (2006.01) |

(52) U.S. Cl.
CPC ............... *E02B 3/06* (2013.01); *E02D 13/04* (2013.01); *E02D 25/00* (2013.01); *E02D 27/52* (2013.01); *E02D 29/025* (2013.01); *E02D 29/0266* (2013.01); *E02D 2250/0076* (2013.01); *E02D 2600/20* (2013.01)

(58) Field of Classification Search
CPC ... E02B 3/04; E02B 3/06; E02D 13/04; E02D 25/00; E02D 27/52; E02D 29/025; E02D 29/0266
See application file for complete search history.

(56) References Cited

U.S. PATENT DOCUMENTS

| | | |
|---|---|---|
| 2022/0081867 A1 | 3/2022 | Kim |
| 2022/0162824 A1 | 5/2022 | Kim |

FOREIGN PATENT DOCUMENTS

| | | | | |
|---|---|---|---|---|
| AU | 2020221514 A1 * | 8/2021 | ............... | E02B 3/06 |
| AU | 2020229253 A1 * | 8/2021 | ............... | E02B 3/06 |
| JP | 2002-047666 A | 2/2002 | | |

(Continued)

OTHER PUBLICATIONS

International Search Report for PCT/KR2021/002662 dated Jun. 18, 2021 from Korean Intellectual Property Office.

*Primary Examiner* — Frederick L Lagman

(74) *Attorney, Agent, or Firm* — Paratus Law Group, PLLC

(57) ABSTRACT

Proposed is a construction method for an underwater concrete block structure. The concrete block structure is formed by stacking a plurality of concrete blocks on a foundation concrete block structure by using a guide pipe, and a concrete column is formed by, before removing the guide pipe, inserting a concrete column forming set such as a waterproof membrane through the inside of the guide pipe, so that the waterproof membrane can be inserted conveniently and safely and the construction speed of the concrete block structure can be further improved.

6 Claims, 20 Drawing Sheets

(56) References Cited

FOREIGN PATENT DOCUMENTS

| KR | 10-0774551 | B1 |   | 11/2007 |
|----|------------|----|---|---------|
| KR | 20090069480 | A | * | 7/2009 |
| KR | 10-1404471 | B1 |   | 6/2014 |
| KR | 101793984 | B1 | * | 11/2017 |
| KR | 10-2022339 | B1 |   | 9/2019 |
| KR | 10-2022341 | B1 |   | 9/2019 |
| KR | 102191675 | B1 | * | 12/2020 |
| KR | 20210029069 | A | * | 3/2021 |
| KR | 20210047481 | A | * | 4/2021 |
| KR | 102310126 | B1 | * | 10/2021 |
| KR | 102333872 | B1 | * | 12/2021 |
| KR | 102353849 | B1 | * | 1/2022 |
| KR | 102389280 | B1 | * | 4/2022 |
| KR | 102401212 | B1 | * | 5/2022 |
| KR | 102548929 | B1 | * | 6/2023 |

* cited by examiner

CONSTRUCTION METHOD FOR UNDERWATER CONCRETE BLOCK STRUCTURE

CROSS-REFERENCE TO PRIOR APPLICATIONS

This application is a Continuation of PCT International Patent Application No. PCT/KR2021/002662 (filed on Mar. 4, 2021), which claims priority to Korean Patent Application No. 10-2020-0029331 (filed on Mar. 10, 2020), which are all hereby incorporated by reference in their entirety.

BACKGROUND

The present disclosure relates generally to a construction method for an underwater concrete block structure in which the underwater concrete block structure can be easily constructed using concrete blocks in the water.

Examples of underwater structures installed in the water include a quay wall, a breakwater, a foundation structure for bridge in the water, a submerged breakwater, and an offshore breakwater, etc.

As a method of easily installing these underwater structures, a technology has been proposed in which a plurality of concrete blocks is stacked on each other in the water to form an underwater concrete block structure and the concrete blocks are bound to each other by concrete columns.

However, in the related art, while a concrete block to be installed needs to be installed on top of another concrete block in the water, due to the difficulty in securing visibility in the water, it is difficult to install the concrete block in the accurate position and it takes a long time to perform the installation.

In addition, in a state in which a concrete column for binding has not yet been formed, since a concrete block positioned adjacently to the water surface is simply stacked on top of another concrete block (that is, the concrete block is not bound to other concrete block), a problem arises in that the concrete block is easy to move away from the original position when subjected to a strong impact caused by a sudden tide or wave.

Meanwhile, the present inventor has proposed "CONSTRUCTION METHOD FOR UNDERWATER CONCRETE BLOCK STRUCTURE" (registered on Sep. 10, 2019) disclosed in Korean Patent No. 10-2022339.

This prior art proposes a technology in which after a foundation concrete block structure is formed, a guide pole is installed in the foundation concrete block structure, and a concrete block is installed by the guide pole.

Meanwhile, in this prior art, after the concrete block is installed using the guide pole, the guide pole is required to be removed. That is, in this prior art, the guide pole is used only for the purpose of installing a concrete block.

In addition, in this prior art, the inside of the guide pole does not contribute to the formation of a concrete block structure.

Meanwhile, in this prior art, a waterproof membrane and a rebar member are required to be inserted into vertical holes of a concrete block, but when the waterproof membrane comes into contact with the concrete block, there is a risk that the waterproof membrane is torn or damaged.

Accordingly, in the prior art, the inserting of the waterproof membrane is required to be performed very carefully.

SUMMARY

The present disclosure has been made to solve the above problems occurring in the prior art, and the present disclosure is intended to propose a construction method for an underwater concrete block structure in which a waterproof membrane can be inserted conveniently and safely such that the construction speed of the concrete block structure can be further improved.

In order to accomplish the above objective, a construction method for an underwater concrete block structure according to the present disclosure includes: a concrete block fabricating step of fabricating a plurality of concrete blocks having a vertical hole extending vertically; a foundation concrete block structure formation step of forming a foundation concrete block structure by installing the concrete block on the underwater ground after the concrete block fabricating step; a guide pole installation step of installing a guide pole which comprises a guide pipe having a shape of a pipe extending vertically and an upper insertion guide coupled detachably to an upper part of the guide pipe and having a shape tapered upward, by inserting and installing a lower end part of the guide pole into the vertical hole of the concrete blocks of the foundation concrete block structure after the foundation concrete block structure formation step; a concrete block stack formation step of forming a concrete block stack by repeating a process of positioning the vertical hole of the concrete block to be installed above the guide pole above the water surface and lowering the concrete block to be installed so that the concrete block to be installed is installed on an upper portion of the foundation concrete block structure in a state in which the guide pole is inserted into the vertical hole of the concrete block to be installed after the guide pole installation step; an upper insertion guide removal step of removing the upper insertion guide of the guide pole after the concrete block stack formation step; and a concrete column formation step of forming a concrete column extending vertically in a continuous hole which is a vertically continuous space defined by the vertical holes of the concrete blocks stacked vertically on each other by inserting a concrete column forming set into the guide pipe, wherein the concrete column forming set comprises a metal reinforcing member extending vertically and a waterproof membrane wrapping lower and lateral sides of the metal reinforcing member and fresh concrete poured into the waterproof membrane, removing the guide pipe upward, and curing the fresh concrete while the waterproof membrane is in close contact with the concrete block stack by pressure of the fresh concrete after the upper insertion guide removal step.

The construction method may further include: a ground borehole formation step of drilling the underwater ground through the inside of the guide pipe to form a ground borehole in the underwater ground after the upper insertion guide removal step; and wherein at the concrete column formation step, the concrete column extending vertically is formed along the continuous hole and the ground borehole by inserting the concrete column forming set through the guide pipe into the ground borehole after the ground borehole formation step, removing the guide pipe upward, and curing the fresh concrete while the waterproof membrane is in close contact with the concrete block stack and the underwater ground by the pressure of the fresh concrete.

At the ground borehole formation step, while the underwater ground is drilled, the guide pipe may be vertically inserted into the underwater ground.

The underwater ground may include a foundation ground which is artificially formed, wherein a foundation ground formation step at which the foundation ground is formed prior to the foundation concrete block structure formation step is comprised, and the foundation ground is any one of foundation ripraps, substituted ripraps, deep-cement-mixed ground, and improved soft ground, and a combination thereof.

After the concrete column formation step, a cap concrete part formation step at which a cap concrete part is formed on the concrete block stack may be added.

After the concrete column formation step, a backfilling step at which backfilling ripraps and filtering ripraps are filled in one side of the concrete block stack and a mat for civil engineering covering the backfilling ripraps and the filtering ripraps is constructed may be added.

As described above, in the construction method of the present disclosure, the waterproof membrane is allowed to be inserted into the guide pole, thereby performing the insertion of the waterproof membrane conveniently and safely.

That is, in the construction method of the present disclosure, the guide pipe installed in the foundation concrete block structure for the installation of a concrete block is used again for the insertion of the waterproof membrane, thereby further improving the construction speed of the concrete block structure without additional cost increase.

DETAILED DESCRIPTION

Figure 1:
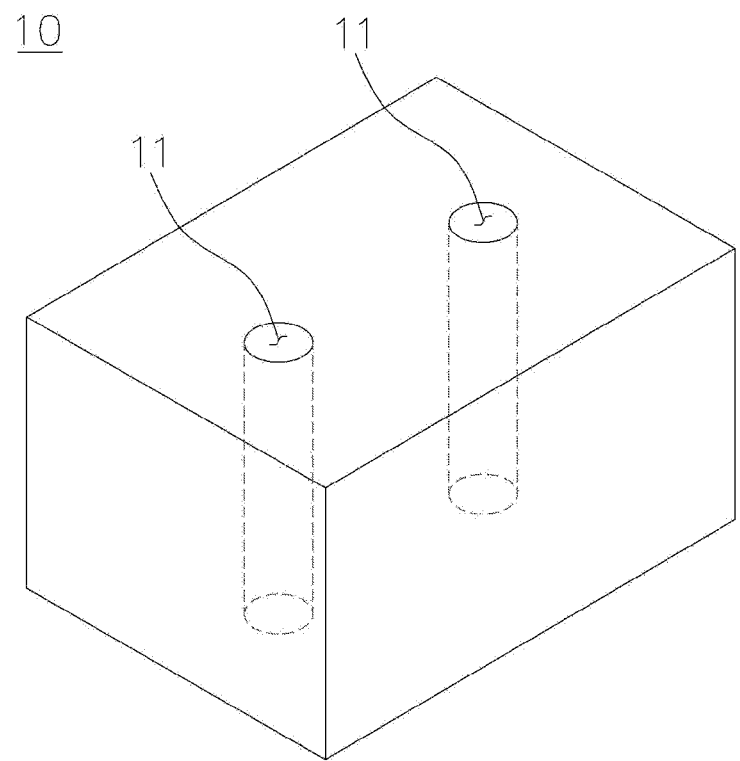
FIG. 1 is a perspective view of a concrete block used in a construction method for an underwater concrete block structure according to a first embodiment of the present disclosure.

Hereinafter, the exemplary embodiment of the present disclosure will be described in detail with reference to the accompanying drawings so that those skilled in the art to which the present disclosure belongs can easily embody the present disclosure. However, the present disclosure may be embodied in various different forms and is not limited to the embodiment described herein. In addition, in the drawings, parts irrelevant to the description of the present disclosure are omitted in order to clearly describe the present disclosure, and similar reference numerals are assigned to similar parts throughout the specification.

Throughout the specification, when a part "includes" a certain component, it means that other components may be further included rather than excluding the other components unless specifically stated to the contrary.

A construction method for an underwater concrete block structure according to a first embodiment of the present disclosure will be described.

Figure 8:
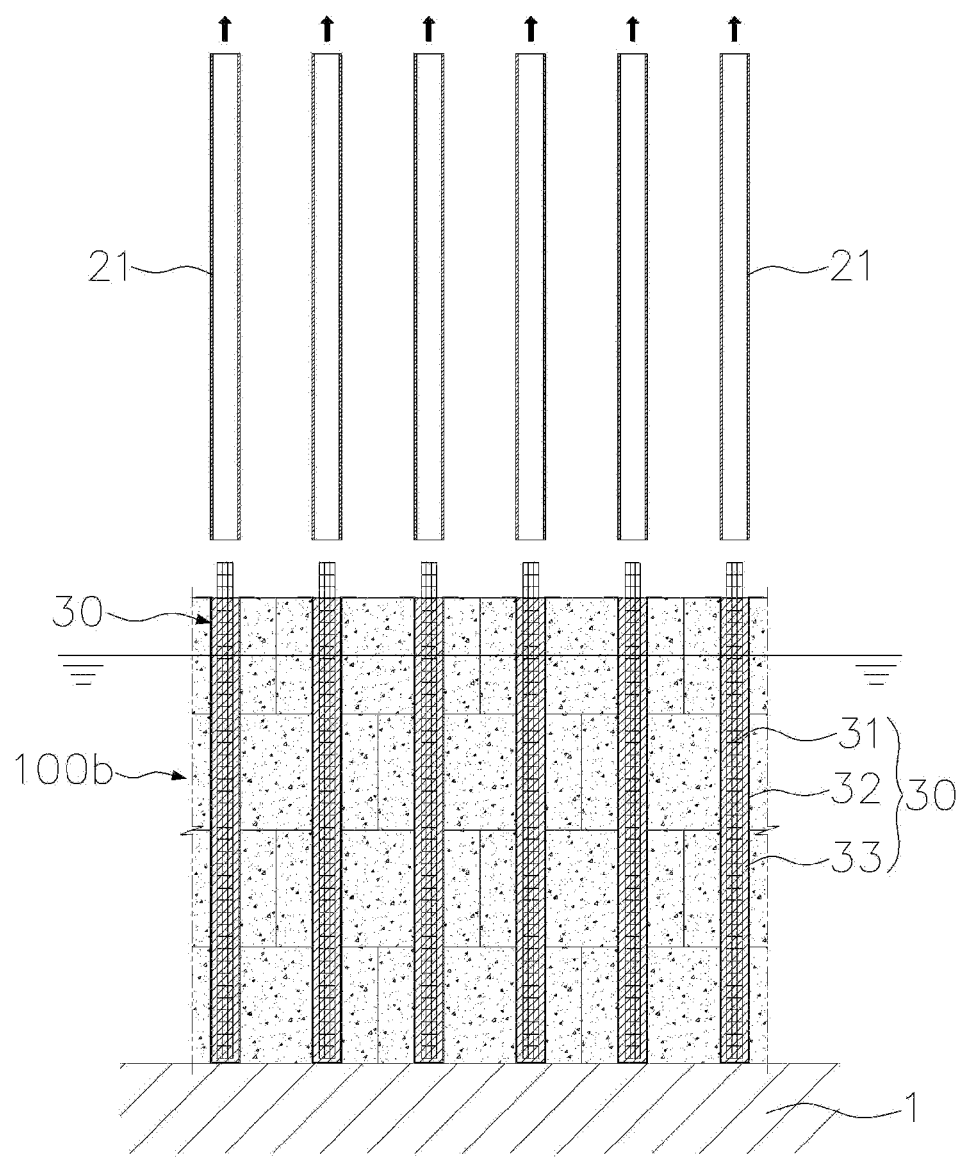
Figure 9:
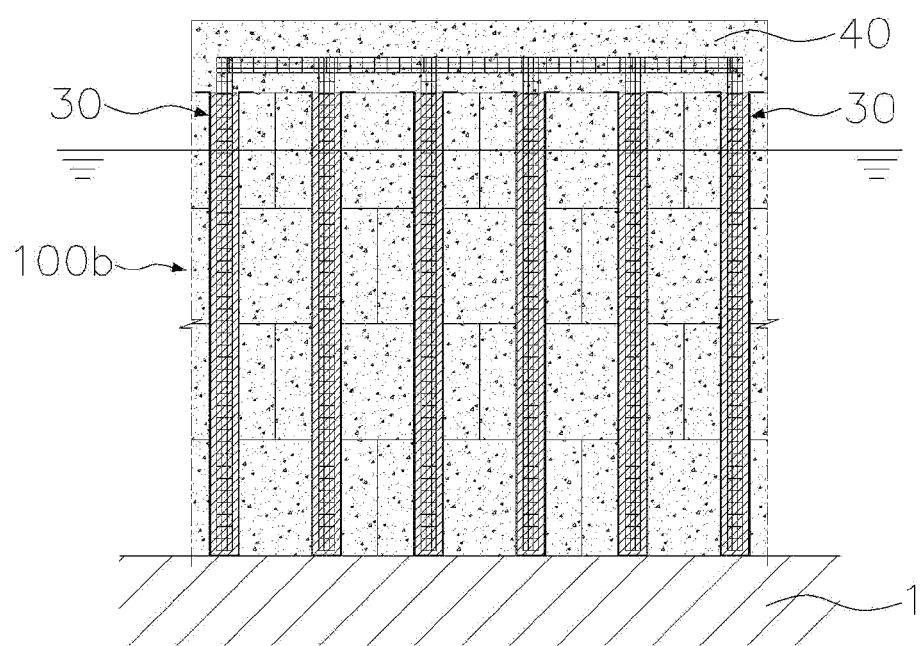
Figure 10:
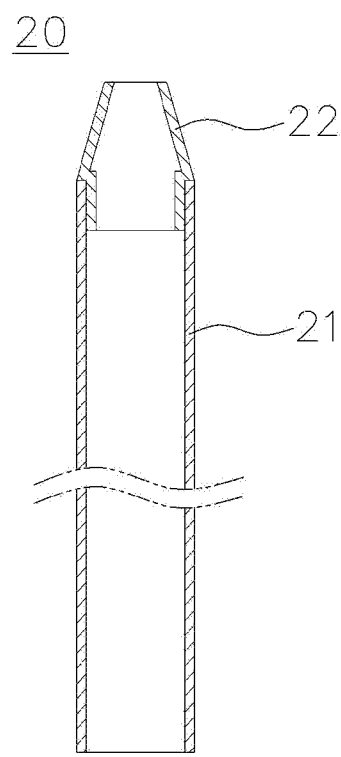
FIG. 10 is the sectional view of a guide pole used in the first embodiment of the present disclosure.
Figure 11:
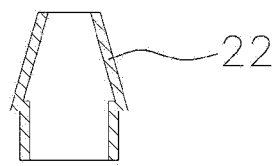
FIG. 11 is an exploded sectional view of FIG. 10, FIGS. 12 to 16 are views illustrating the construction method for an underwater concrete block structure in order according to a second embodiment of the present disclosure.
Figure 11:
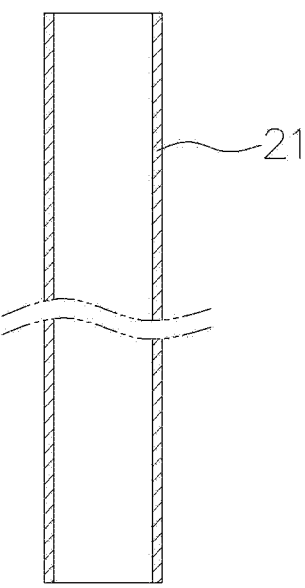

FIG. 1 is a perspective view of a concrete block used in the construction method for an underwater concrete block structure according to the first embodiment of the present disclosure, FIGS. 2 to 9 are views illustrating the construction method for an underwater concrete block structure in order according to the first embodiment of the present disclosure, FIG. 10 is the sectional view of a guide pole used in the first embodiment of the present disclosure, and FIG. 11 is an exploded sectional view of FIG. 10.

First, a concrete block fabricating step is performed.

In FIG. 1, the concrete block 10 used in the present embodiment is illustrated. Concrete blocks 10 are stacked on each other in the water to construct the underwater concrete block structure, and in this embodiment, the concrete block is a rectangular parallelepiped concrete block, and two vertical holes 11 extending vertically are formed in the concrete block.

The vertical hole 11 of the concrete block 100 of this embodiment is a penetrating hole that penetrates the concrete block 10 in the vertical direction.

After the concrete block fabricating step, a foundation concrete block structure formation step is performed.

Figure 2:
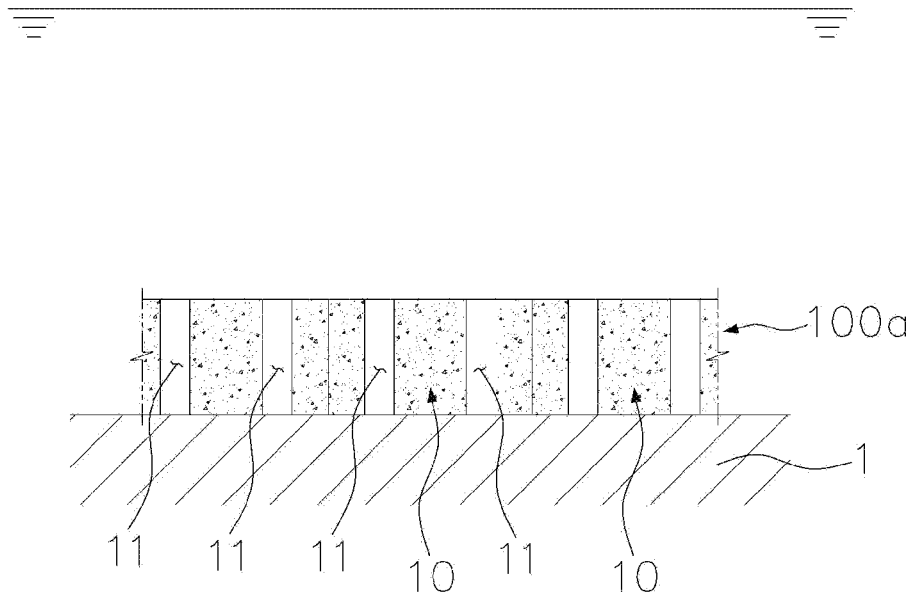
FIGS. 2 to 9 are views illustrating the construction method for an underwater concrete block structure in order according to the first embodiment of the present disclosure.

As illustrated in FIG. 2, one or more concrete blocks 10 are installed on the underwater ground 1 to form the foundation concrete block structure 100a.

In the embodiment, the foundation concrete block structure 100a is formed by disposing a plurality of concrete blocks 10 in a horizontal direction on the underwater ground 1.

The foundation concrete block structure 100a may be formed in a single layer on the underwater ground 1, or in other embodiments, the foundation concrete block structure may be formed in two layers by stacking another concrete block 10 on top of the concrete block 10 disposed on the underwater ground 1.

After the foundation concrete block structure formation step, a guide pole installation step is performed.

In the guide pole installation step, at least one guide pole 20 extending vertically is required.

The guide pole 20 according to the embodiment includes a guide pipe 21 and an upper insertion guide 22 as illustrated in FIGS. 10 and 11.

The guide pipe 21 has a shape of a pipe extending in a vertical direction, and a hole extending in the vertical direction along the inside of the guide pipe is formed, and the upper and lower parts of the guide pipe are open.

The upper insertion guide 22 is coupled detachably to the upper part of the guide pipe 21 and has a shape tapered upward.

The upper insertion guide 22 is intended for the upper end of the guide pole 20 to be easily inserted into the vertical hole 11 of the concrete block 10 to be installed.

Figure 3:
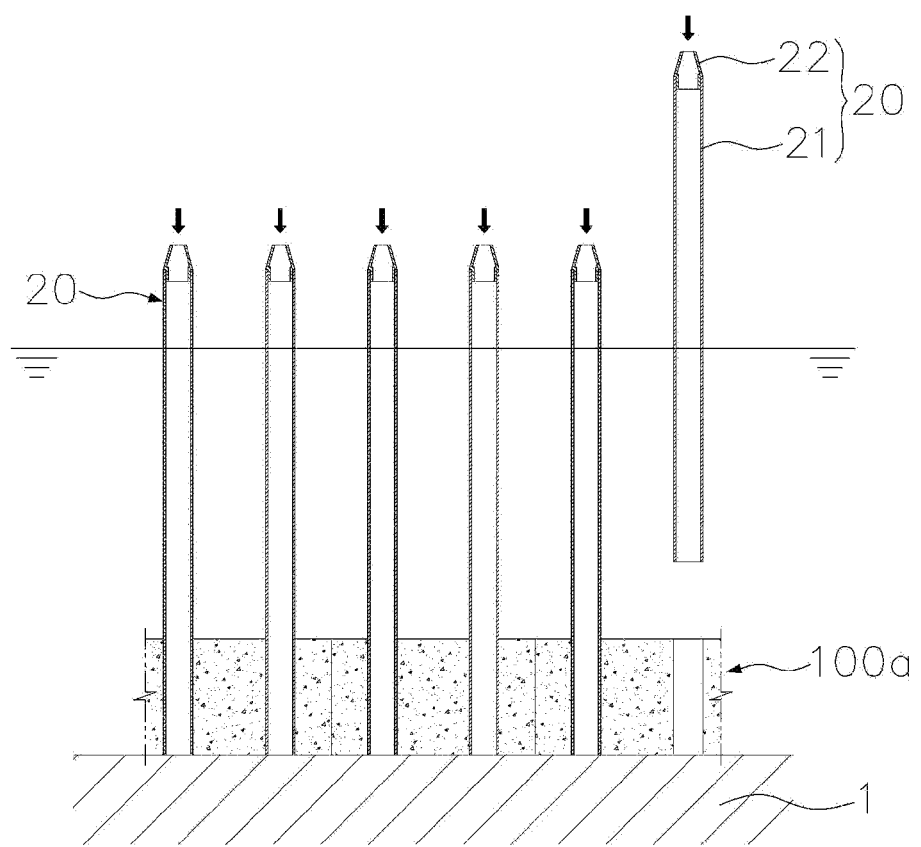

As illustrated in FIG. 3, in a state in which the upper insertion guide 22 is coupled to the upper part of the guide pipe 21, the lower end part of the guide pipe 21 is inserted into the vertical hole 11 of the concrete block 10 constituting the foundation concrete block structure 100a such that the guide pole is vertically installed in the foundation concrete block structure 100a.

In addition, as illustrated in FIG. 3, the lower end part of the guide pole 20 is inserted into the vertical hole 11 of the concrete block 10 constituting the foundation concrete block structure 100a, and the upper end part of the guide pole 20 protrudes upward from a water surface.

In the embodiment, two vertical holes 11 are formed in one concrete block 10, and thus two guide poles 20 are installed in one concrete block 10.

The guide pole 20 is manufactured longer than the water depth, and thus when the guide pole 20 is installed, the upper end part of the guide pole 20 protrudes upward from the water surface. When the upper end part of the guide pole 20 protrudes upward from the water surface, the position of the guide pole 20 can be checked with the naked eye, so the concrete block 10 to be installed can be easily located above the guide pole 20.

That is, the installation position of the concrete block 10 is easily checked above the water surface, and the planar position setting of the concrete block 10 above the water surface is performed.

After the guide pole installation step, a concrete block stack formation step is performed.

Figure 4:
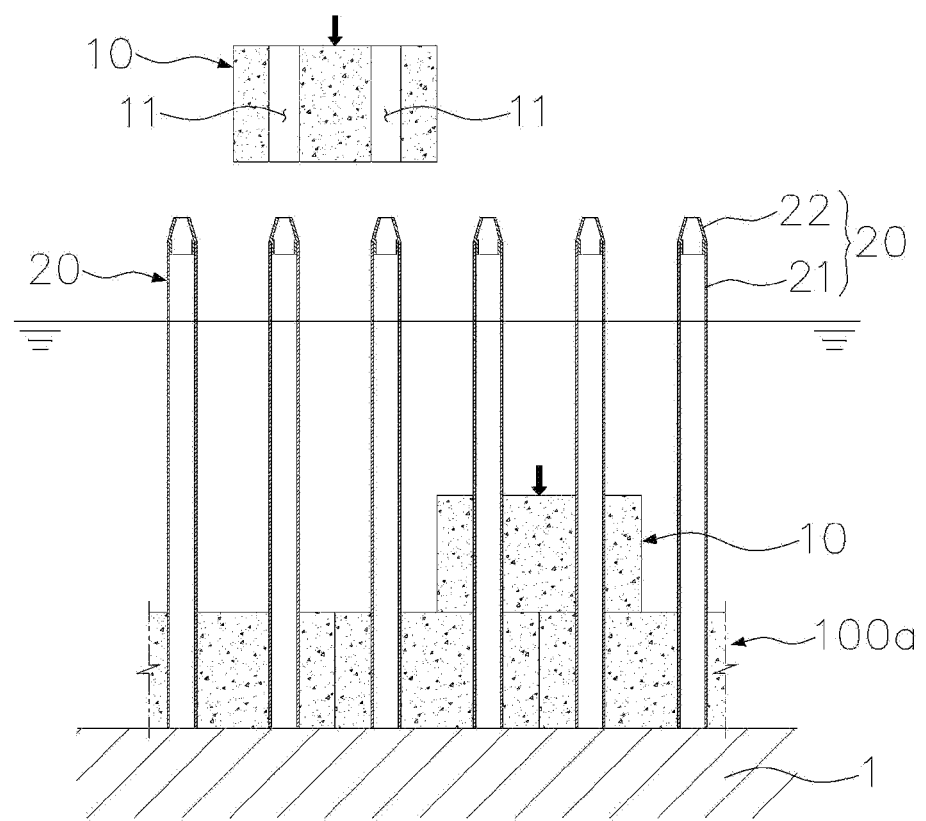
Figure 5:
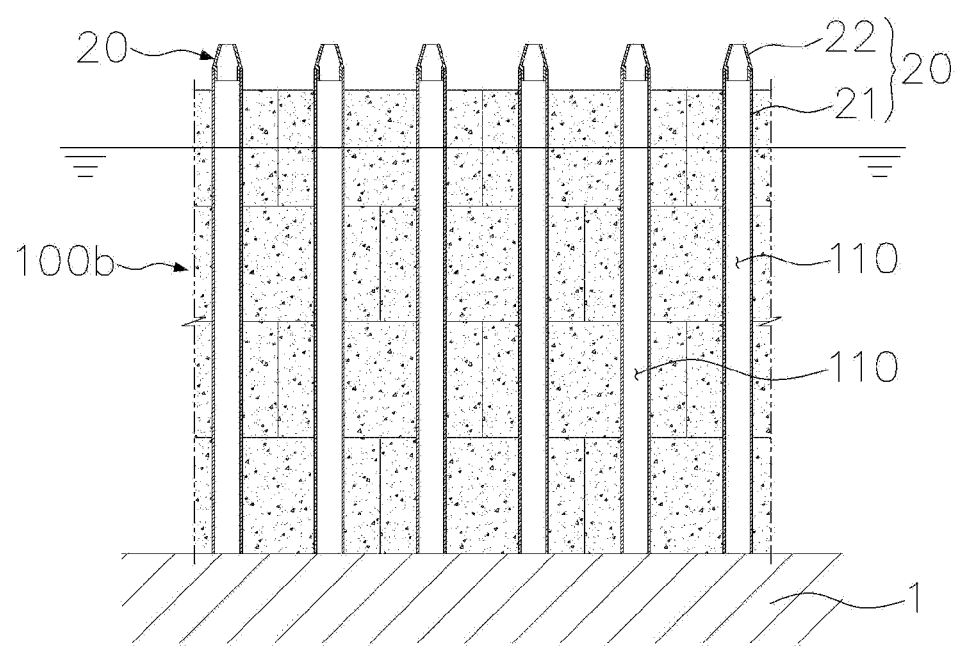

After the installation of the guide pole 20 is completed, as illustrated in FIGS. 4 and 5, a process in which the concrete block 10 to be installed is installed on the foundation concrete block structure 100a under the guidance of the guide pole 20 is repeated to form the concrete block stack 100b.

The installation process of the concrete block 10 to be installed includes a planar position setting step at which the concrete block 10 to be installed is located above the guide pole 20, and a concrete block lowering step at which the concrete block 10 is lowered after the planar position setting step.

At the planar position setting step, when locating the concrete block 10 above the guide pole 20, the vertical hole 11 of the concrete block 10 is located above the guide pole 20. This step is performed above the water surface and thus is performed rapidly and precisely.

Meanwhile, at the planar position setting step, one concrete block 10 to be installed is located to be offset in a horizontal direction from another concrete block 10 located under the one concrete block 10.

Accordingly, when the planar position setting step is completed, the concrete block 10 to be installed is lowered. This is performed above and under the water surface.

By lowering the concrete block 10 to be installed, the concrete block 10 is seated on the foundation concrete block structure 100a while being guided along the guide poles 20 which are inserted into the vertical holes 11 of the concrete block 10 to be installed.

As in the embodiment, the position and posture of the concrete block 10 to be installed are guided by two guide poles 20, and thus the horizontal position and posture of the concrete block 10 to be installed may be securely fixed.

When the concrete block 10 to be installed is installed on the foundation concrete block structure 100a, two guide poles 20 are inserted respectively into the vertical holes 11 of the concrete block 10 to be installed.

When a plurality of concrete blocks 10 to be installed is installed on the foundation concrete block structure 100a by repeating the process described above, the concrete block stack 100b may be formed as illustrated in FIG. 5.

Since the concrete blocks 10 to be installed are stacked on each other under the guidance of the guide poles 20, the concrete block 10 to be installed may be easily installed on the foundation concrete block structure 100a or on another concrete block 10 installed thereon.

Particularly, even when underwater visibility is not secured, the concrete block 10 may be easily installed under the guidance of the guide pole 20 protruding above the water surface, and an installed concrete block 10 is maintained to be coupled to another concrete block 10 by the guide pole 20.

Meanwhile, vertical holes 11 of a plurality of concrete blocks 10 stacked vertically on each other are continuously formed in a vertical direction in the concrete block stack 100b so as to form a continuous hole 110 which defines continuous space in the vertical direction. The continuous hole 110 is space in which a concrete column 30 is formed later.

Furthermore, the guide pipe 21 of the guide pole 20 is inserted into each of the continuous holes 110 of the concrete block stack 100b.

After the concrete block stack formation step, an upper insertion guide removal step is performed.

Figure 6:
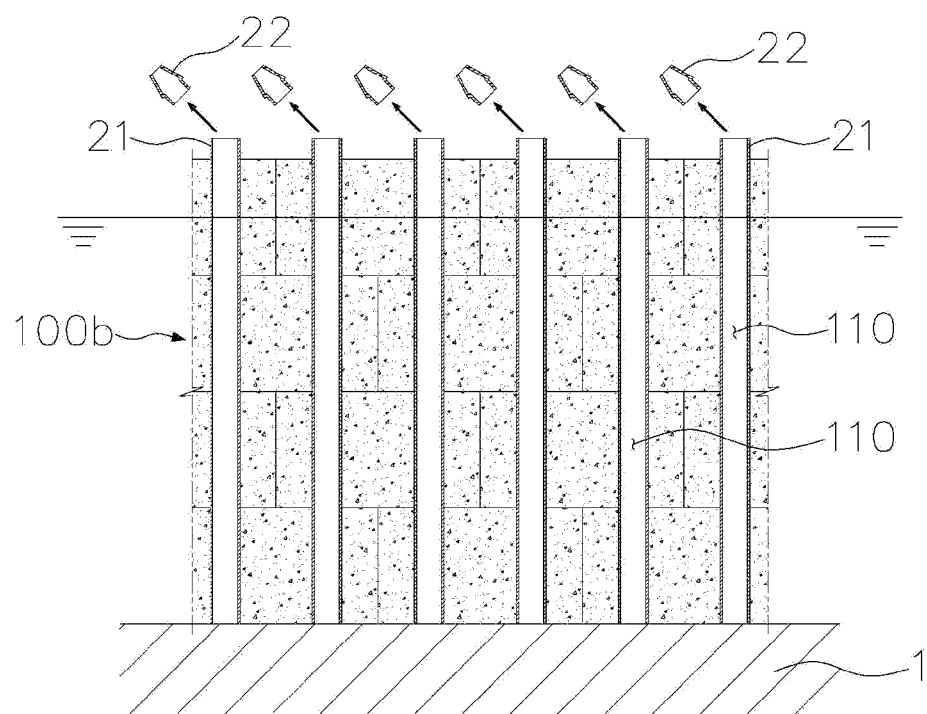

As illustrated in FIG. 6, the upper insertion guide 22 of the guide pole 20 is removed.

Accordingly, only the guide pipe 21 of the guide pole 20 is left in the concrete block stack 100b, and a concrete column forming set 30 to be described later may be inserted into the guide pipe 21.

The guide pipe 21 has a smooth inner circumferential surface, and thus while a waterproof membrane 32 to be described later is inserted into the guide pipe 21, the waterproof membrane 32 is not torn or damaged.

After the upper insertion guide removal step, a concrete column formation step is performed.

In this embodiment, the concrete column formation step is performed in the process of removing the guide pipe 21 upward while inserting the concrete column forming set 30 into the guide pipe 21.

The concrete column forming set 30 includes a metal reinforcing member 31 extending in a vertical direction, the waterproof membrane 32 wrapping lower and lateral sides of the metal reinforcing member 31, and unhardened concrete 33 (referred to as "fresh concrete") poured into the waterproof membrane 32.

When the guide pipe 21 is removed upward while the concrete column forming set 30 is inserted into the guide pipe 21, the concrete column forming set 30 is left in the continuous hole 110, and the fresh concrete 33 is cured while the waterproof membrane 32 is in close contact with the concrete block stack 100b by the pressure of the fresh concrete 33, and thus the concrete column 30 extending in the vertical direction is formed in the continuous hole 110 of the concrete block stack 100b.

In the description above and below, the same numerals are given to the concrete column forming set 30 and the concrete column 30. This is because the concrete column forming set 30 inserted into the continuous hole 110 is formed into the concrete column 30 due to the curing of the fresh concrete 33.

The concrete column formation step will be described in more detail.

Figure 7:
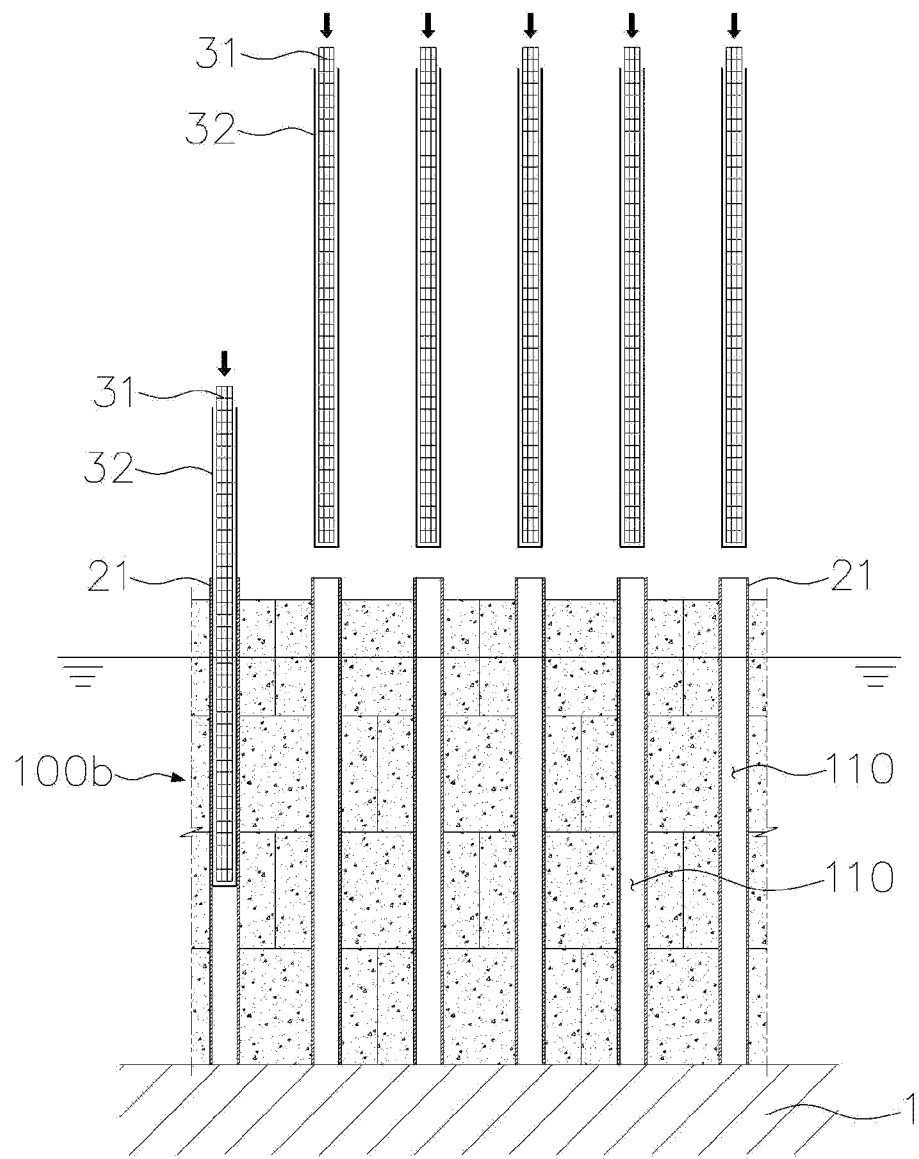

First, as illustrated in FIG. 7, the metal reinforcing member 31 extending in the vertical direction and the waterproof membrane 32 wrapping lower and lateral sides of the metal reinforcing member 31 are inserted into the guide pipe 21.

The metal reinforcing member 31 may be a general reinforcing bar assembly, H-Beam, or steel pipe, etc., and the shape of the metal reinforcing member 31 may be variously changed. The metal reinforcing member 31 reinforces the strength of the concrete.

When the metal reinforcing member 31 and the waterproof membrane 32 are inserted up to the intermediate depth of the guide pipe 21, a portion of the fresh concrete 33 is poured into the waterproof membrane 32, and the metal reinforcing member 31, the waterproof membrane 32, and the fresh concrete 33 are inserted up to the lower end part of the guide pipe 21, and next, while the guide pipe 21 is removed upward, the fresh concrete 33 is completely poured into the waterproof membrane 32.

According to embodiments, after the fresh concrete 33 is completely filled in the waterproof membrane 32, the guide pipe 21 may be removed upward.

Accordingly, as illustrated in FIG. 8, while the concrete column forming set 30 is inserted into the continuous hole 110 of the concrete block stack 100b, the guide pipe 21 is removed.

In the embodiment, although it is explained that all concrete columns 30 are formed at once, a concrete column 30 may be first formed in a portion of the continuous hole 110 into which the guide pipe 21 is inserted, and then a concrete column 30 may be formed in the remaining portion of the continuous hole 110 into which the guide pipe 21 is inserted.

That is, a plurality of guide pipes 21 disposed in the concrete block stack 100b may be divided into a plurality of groups and may be sequentially removed to sequentially form concrete columns 30.

A plurality of concrete blocks 10 stacked on each other in the vertical directions is integrated with each other by the concrete columns 30.

After the concrete column formation step, a cap concrete part formation step is performed.

After the concrete column 30 is formed, as illustrated in FIG. 9, a cap concrete part 40 may be formed on the concrete block stack 100b.

Next, the construction method for an underwater concrete block structure according to a second embodiment of the present disclosure will be described.

FIGS. 12 to 16 are views illustrating the construction method for an underwater concrete block structure in order according to the second embodiment of the present disclosure.

Like the first embodiment, the construction method for an underwater concrete block structure according to the second embodiment includes the concrete block fabricating step, the foundation concrete block structure formation step, the guide pole installation step, and the concrete block stack formation step.

Figure 12:
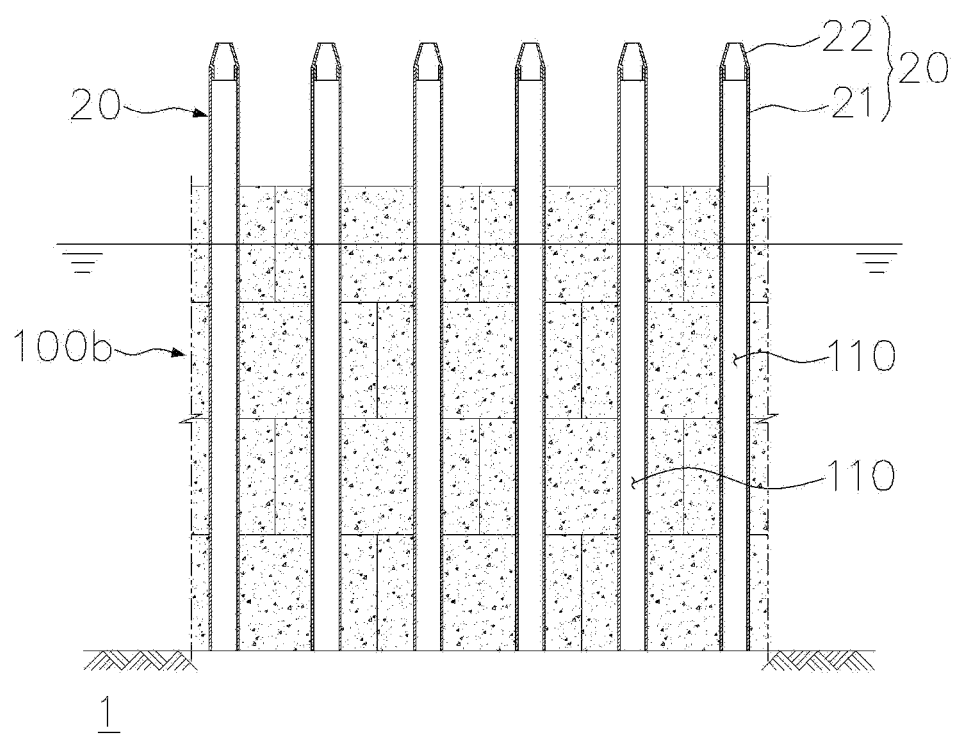

FIG. 12 is the sectional view of the concrete block stack 100b formed according to the second embodiment of the present disclosure.

FIG. 12 is a view corresponding to FIG. 5 illustrating the first embodiment and illustrates that the length of the guide pole 20, particularly, the length of the guide pipe 21 is longer than the length of the guide pipe 21 of FIG. 5.

Figure 13:
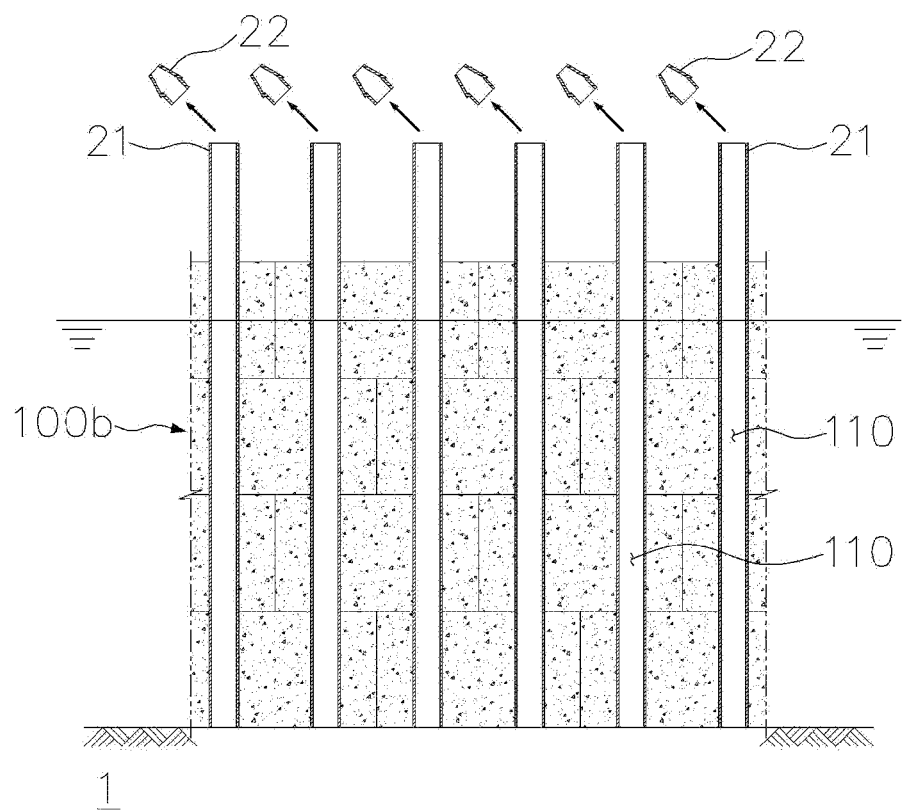

After the concrete block stack formation step, the upper insertion guide removal step is performed as illustrated in FIG. 13.

After the upper insertion guide removal step, a ground borehole formation step is performed.

Figure 14:
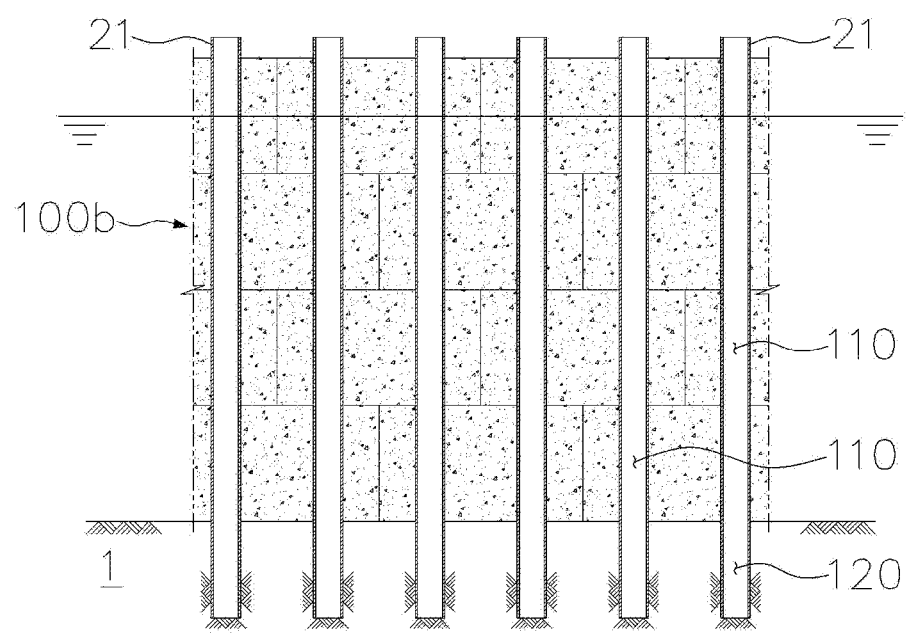

As illustrated in FIG. 14, the underwater ground 1 is drilled through the inside of the guide pipe 21 to form a ground borehole 120 in the underwater ground 1.

Furthermore, while the underwater ground 1 is drilled, the guide pipe 21 may be vertically inserted into the underwater ground 1.

Accordingly, the ground borehole 120 is formed under the continuous hole 110, and the guide pipe 21 is located in the continuous hole 110 and the ground borehole 120.

In this case, during or after the drilling, the guide pipe prevents a neighboring underwater ground 1 from collapsing into the ground borehole 120 or prevents various types of foreign matter from being introduced into the ground borehole 120.

After the ground borehole formation step, the concrete column formation step is formed.

Figure 15:
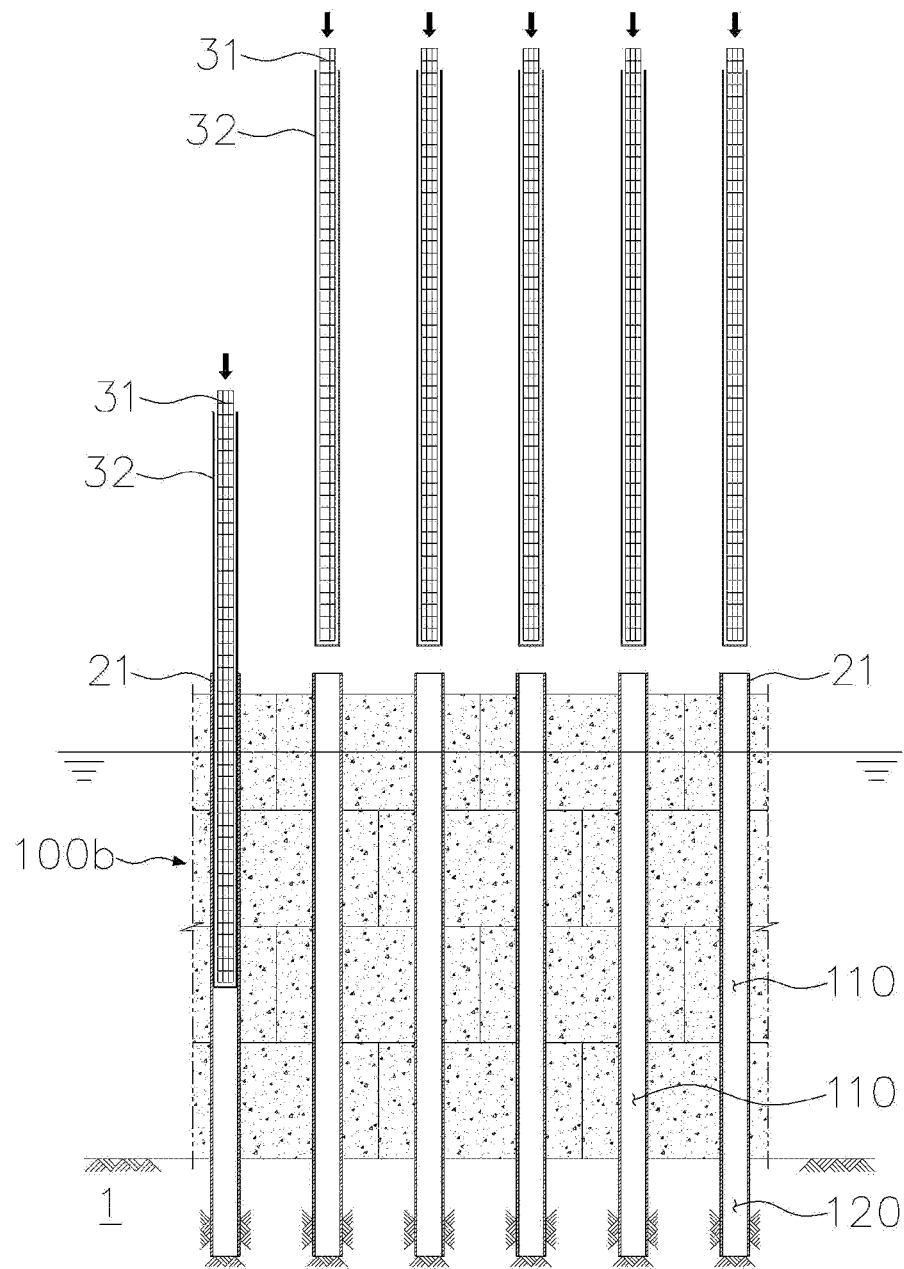
Figure 16:
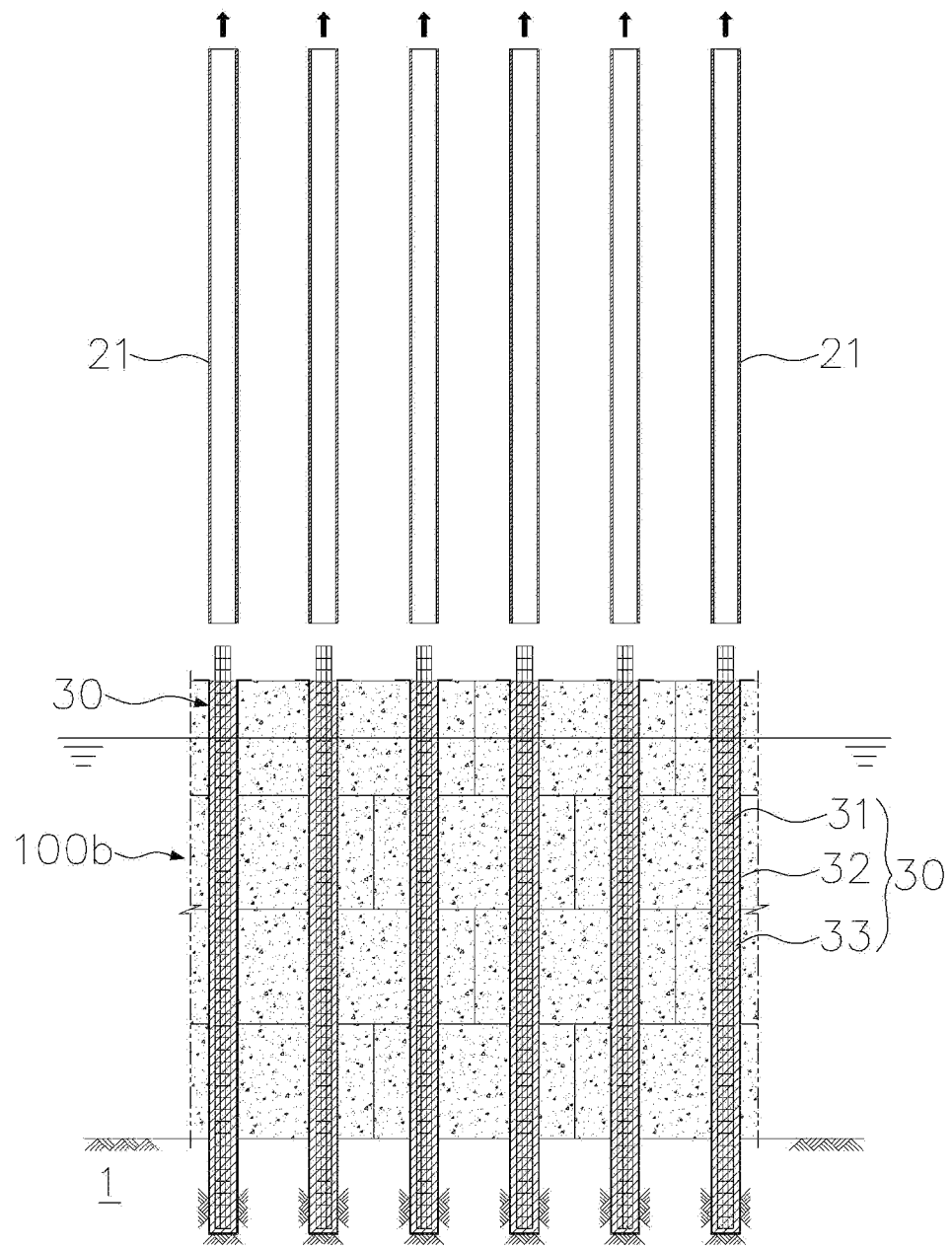

In the embodiment, as illustrated in FIGS. 15 and 16, the concrete column formation step is performed in a process in which the guide pipe 21 is removed upward while the concrete column forming set 30 is inserted into through the guide pipe 21 into the ground borehole 120.

Accordingly, while the waterproof membrane 32 is in close contact with the concrete block stack 100b and the underwater ground 1 by the pressure of the fresh concrete 33, the fresh concrete 33 is cured, and thus the concrete column 30 extending in the vertical direction is formed along the continuous hole 110 of the concrete block stack 100b and the ground borehole 120.

That is, the concrete column 30 allows a plurality of concrete blocks 10 stacked on each other in a vertical direction to be bound to each other, and allows the plurality of concrete blocks 10 to be bound to the underwater ground 1.

Hereinafter, a third embodiment of the present disclosure will be described.

Figure 17:
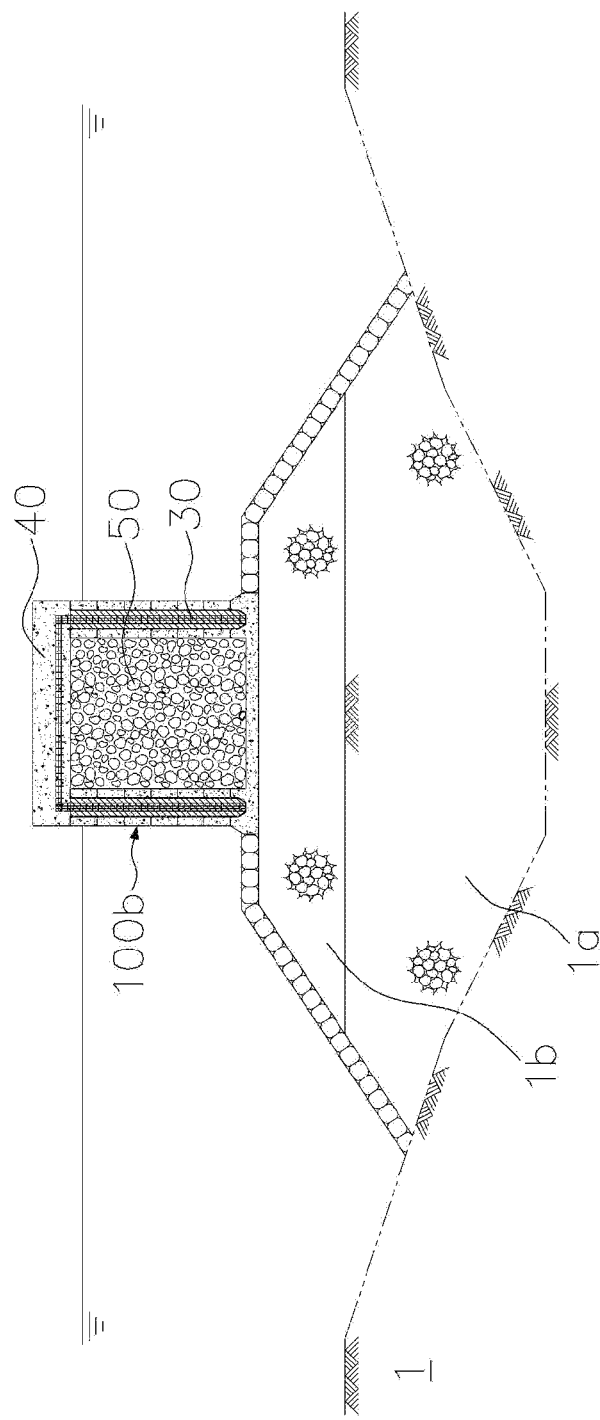
FIG. 17 is a sectional view of an underwater concrete block structure constructed according to a third embodiment of the present disclosure.
Figure 18:
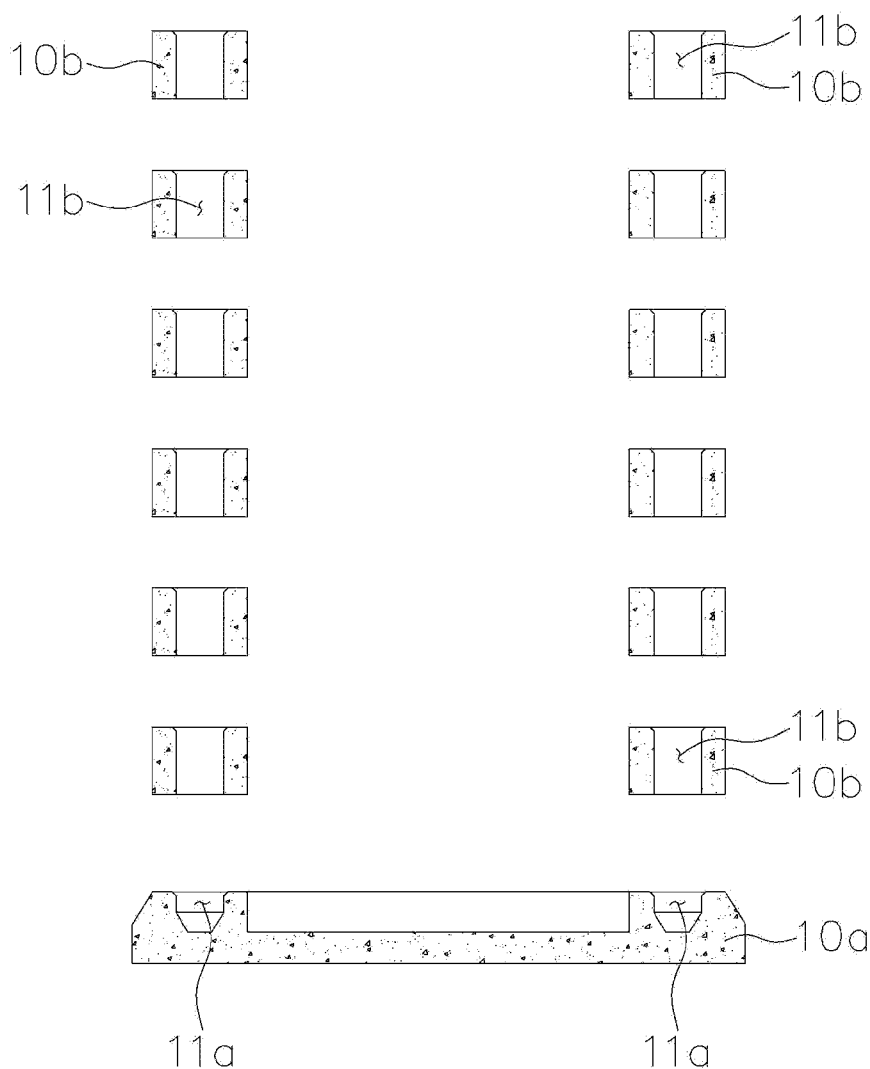
FIG. 18 is a view illustrated by separating sectional views of a plurality of concrete blocks used in FIG. 17.

FIG. 17 is a sectional view of an underwater concrete block structure constructed according to the third embodiment of the present disclosure, and FIG. 18 is a view illustrated by separating sectional views of a plurality of concrete blocks used in FIG. 17.

In FIG. 17, after a portion of the underwater ground 1 is excavated, a foundation ground is artificially formed.

That is, after substituted ripraps 1a is formed, foundation ripraps 1b is formed on the substituted ripraps 1a to artificially form the foundation ground, and then the underwater concrete block structure is constructed on the foundation ripraps 1b.

That is, before the foundation concrete block structure formation step, a foundation ground formation step is performed.

In the first embodiment and the second embodiment, the underwater ground 1 is an underwater ground which is not artificially formed, that is, the seafloor, but according to embodiments, the underwater ground 1 includes the foundation ground artificially formed for the underwater concrete block structure.

That is, when the foundation concrete block structure 100a is formed after the foundation ground is artificially formed on the underwater ground 1, the foundation ground formation step at which the foundation ground is formed is required prior to the foundation concrete block structure formation step.

The foundation ground may be any one of foundation ripraps, substituted ripraps, deep-cement-mixed ground, and improved soft ground, and a combination thereof.

The improved soft ground refers to the ground improved according to a soft ground improvement method in which the ground is improved according to a substitution method, a consolidation method, a dehydration method, a drainage method, a vibration compaction method, a sand compaction pile method, a blasting method, or a chemical injection method when a required bearing capacity cannot be obtained since the ground is soft.

In addition, in FIG. 17, after the concrete block stack 100b and the concrete column 30 are formed, a filling step and the cap concrete part formation step are added.

That is, as illustrated in FIG. 17, space for filling is defined inside the concrete block stack 100b, and a filling material 50 (sand, gravel, or riprap, etc.) is filled in the space for filling of the concrete block stack 100b.

In addition, after the concrete column 30 is formed, the cap concrete part 40 is formed on the concrete block stack 100b.

FIG. 18 is a view illustrated by separating sectional views of a plurality of concrete blocks used in FIG. 17.

In FIG. 18, a concrete block 10a located at the lowest position is a concrete block for forming the foundation concrete block structure 100a, and a vertical hole 11a of the concrete block may have a shape of a groove with an open top and a closed bottom.

Furthermore, in FIG. 18, remaining concrete blocks 10b are concrete blocks 10b to be installed in the concrete block stack formation step, and a vertical hole 11b of each of the concrete blocks is a penetrating hole that penetrates the concrete block 10b in a vertical direction.

Figure 19:
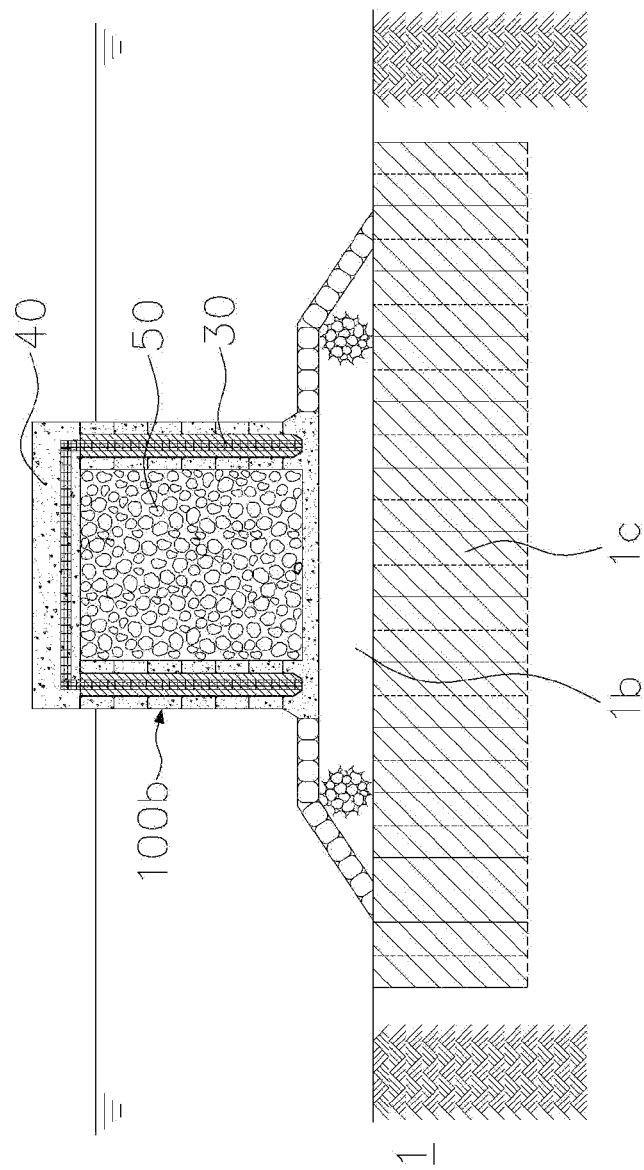
FIG. 19 is a sectional view of an underwater concrete block structure constructed according to a fourth embodiment of the present disclosure.

FIG. 19 is a sectional view of an underwater concrete block structure constructed according to a fourth embodiment of the present disclosure.

In FIG. 19, after a portion of the underwater ground 1 is improved to the deep-cement-mixed ground 1c, the foundation ripraps 1b is formed on the deep-cement-mixed ground 1c, and then the underwater concrete block structure is constructed on the foundation sandstone ground 1b.

That is, in the embodiment, as the foundation ground, the deep-cement-mixed ground 1c and the foundation ripraps 1b are combined.

That is, before the concrete block stack formation step, the foundation ground formation step is performed.

Figure 20:
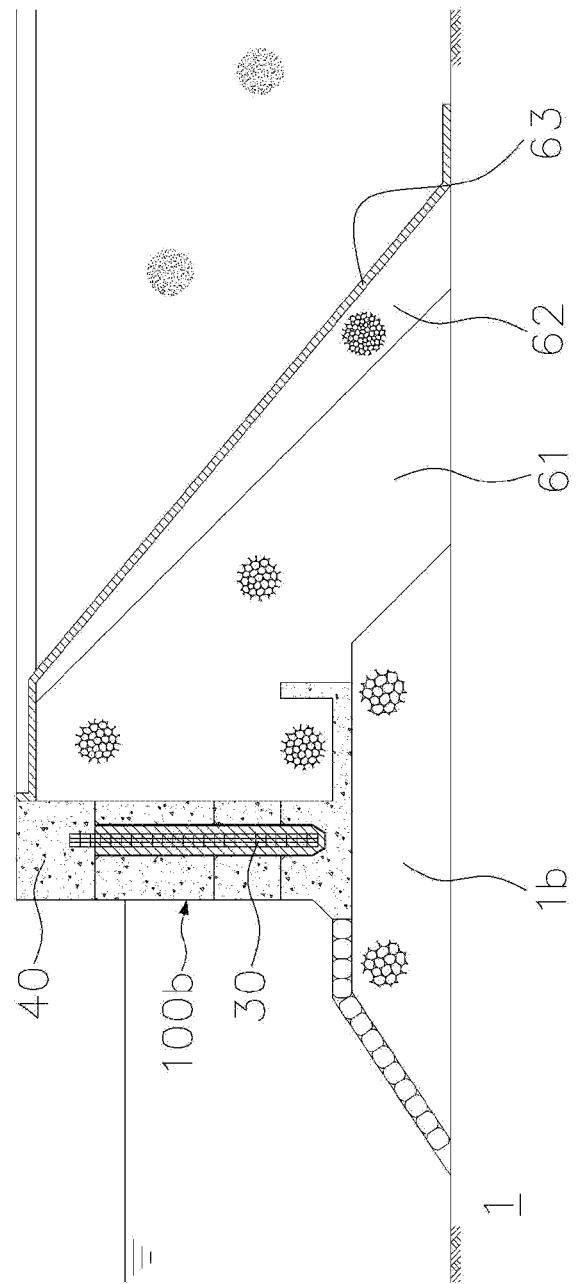
FIG. 20 is a sectional view of an underwater concrete block structure constructed according to a fifth embodiment of the present disclosure.

FIG. 20 is a sectional view of an underwater concrete block structure constructed according to a fifth embodiment of the present disclosure.

In the embodiment, after the foundation ripraps 1b is formed on the underwater ground 1, the underwater concrete block structure is constructed on the foundation ripraps 1b.

Furthermore, the concrete column 30 is formed, and the cap concrete part 40 is formed.

After the cap concrete part 40 is formed, a backfilling step at which backfilling ripraps 61 and filtering ripraps 62 are filled in one side of the concrete block stack 100b and a mat for civil engineering 63 covering the backfilling ripraps 61 and the filtering ripraps 62 is constructed is performed.

The above description of the present disclosure is only for illustrative purposes, and those skilled in the art will appreciate that various modifications are possible without departing from the scope and spirit of the present disclosure. Therefore, it should be understood that the embodiment described above is illustrative in all respects and not limiting. For example, each component described as a single type may be implemented in a distributed manner, and similarly, components described as being distributed may also be implemented in a combined form.

The scope of the present disclosure is indicated by the claims to be described later rather than the detailed description, and it should be interpreted that all changes or modified forms derived from the meaning and scope of the claims and concept equivalent thereto are included in the scope of the present disclosure.

The construction method of the present disclosure may be used to construct an underwater concrete block structure such as a quay wall, a breakwater, a foundation structure for bridge in the water, a submerged breakwater, and an offshore breakwater, etc.

What is claimed is:

1. A construction method for an underwater concrete block structure, the construction method comprising:
a concrete block fabricating step of fabricating a plurality of concrete blocks having a vertical hole extending vertically;
a foundation concrete block structure formation step of forming a foundation concrete block structure by installing the concrete block on the underwater ground after the concrete block fabricating step;
a guide pole installation step of installing a guide pole which comprises a guide pipe having a shape of a pipe extending vertically and an upper insertion guide coupled detachably to an upper part of the guide pipe and having a shape tapered upward, by inserting and installing a lower end part of the guide pole into the vertical hole of the concrete blocks of the foundation concrete block structure after the foundation concrete block structure formation step;
a concrete block stack formation step of forming a concrete block stack by repeating a process of positioning the vertical hole of the concrete block to be installed above the guide pole above the water surface and lowering the concrete block to be installed so that the concrete block to be installed is installed on an upper portion of the foundation concrete block structure in a state in which the guide pole is inserted into the vertical hole of the concrete block to be installed after the guide pole installation step;
an upper insertion guide removal step of removing the upper insertion guide of the guide pole after the concrete block stack formation step;
and a concrete column formation step of forming a concrete column extending vertically in a continuous hole which is a vertically continuous space defined by the vertical holes of the concrete blocks stacked vertically on each other by inserting a concrete column forming set into the guide pipe, wherein the concrete column forming set comprises a metal reinforcing member extending vertically and a waterproof membrane wrapping lower and lateral sides of the metal reinforcing member and fresh concrete poured into the waterproof membrane, removing the guide pipe upward, and curing the fresh concrete while the waterproof membrane is in close contact with the concrete block stack by pressure of the fresh concrete after the upper insertion guide removal step.

2. The construction method of claim 1, further comprising:
a ground borehole formation step of drilling the underwater ground through the inside of the guide pipe to form a ground borehole in the underwater ground after the upper insertion guide removal step; and
wherein at the concrete column formation step, the concrete column extending vertically is formed along the continuous hole and the ground borehole by inserting the concrete column forming set through the guide pipe into the ground borehole after the ground borehole formation step, removing the guide pipe upward, and curing the fresh concrete while the waterproof membrane is in close contact with the concrete block stack and the underwater ground by the pressure of the fresh concrete.

3. The construction method of claim 2, wherein at the ground borehole formation step, while the underwater ground is drilled, the guide pipe is vertically inserted into the underwater ground.

4. The construction method of claim 1, wherein the underwater ground comprises a foundation ground which is artificially formed, wherein a foundation ground formation step at which the foundation ground is formed prior to the foundation concrete block structure formation step is comprised, and the foundation ground is any one of foundation ripraps, substituted ripraps, deep-cement-mixed ground, and improved soft ground, and a combination thereof.

5. The construction method of claim 1, wherein after the concrete column formation step, a cap concrete part formation step at which a cap concrete part is formed on the concrete block stack is added.

6. The construction method of claim 1, wherein after the concrete column formation step, a backfilling step at which backfilling ripraps and filtering ripraps are filled in one side of the concrete block stack and a mat for civil engineering covering the backfilling ripraps and the filtering ripraps is constructed is added.

* * * * *